Aug. 27, 1946.                B. A. DE WAERN                    2,406,491
                        INTERNAL-COMBUSTION ENGINE
                          Filed April 15, 1944         3 Sheets-Sheet 1

INVENTOR.

Aug. 27, 1946.     B. A. DE WAERN     2,406,491
INTERNAL-COMBUSTION ENGINE
Filed April 15, 1944     3 Sheets-Sheet 3
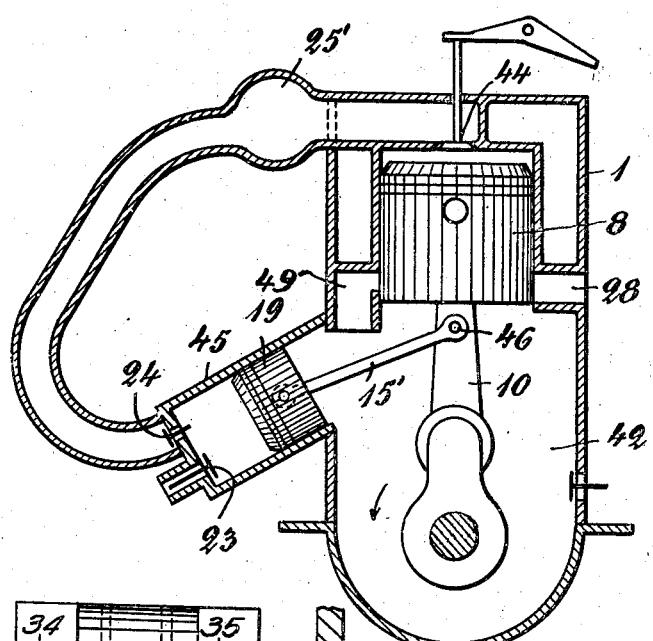
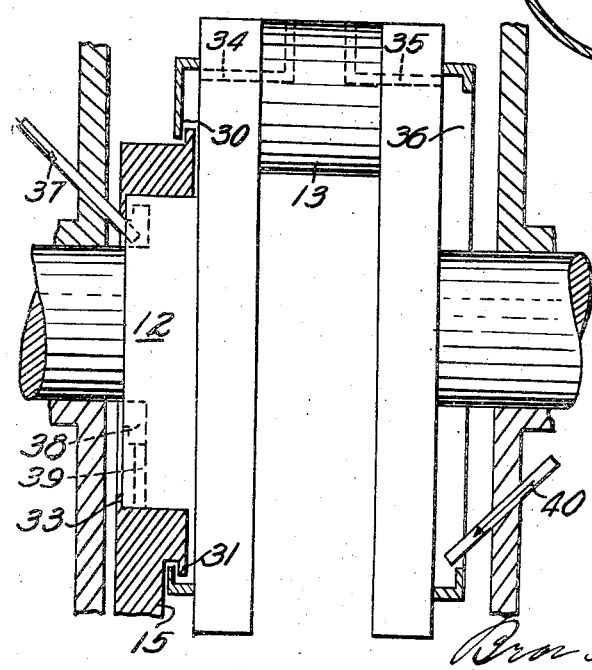
INVENTOR Patented Aug. 27, 1946

2,406,491

UNITED STATES PATENT OFFICE 2,406,491

INTERNAL-COMBUSTION ENGINE

Bror Algor de Waern, Riksby, Sweden

Application April 15, 1944, Serial No. 531,141
In Sweden May 2, 1939

14 Claims. (Cl. 123—69)

In internal combustion engines the output may be increased by supplying more air to the combustion chamber than that displaced by the engine piston. The additional air may be supplied by compressors of different kinds, such as of piston or rotor types.

Particularly in two-stroke engines it is known to adapt the crank case to operate as a scavenging air compressor directly associated with a scavenging air inlet in the wall of the combustion chamber. The compression caused by the crank case may be improved by providing an additional compressor of piston type entirely or partially separated from the crank case and communicating with the combustion chamber via a valve-controlled receiver. In this case scavenging air will be supplied by the crank case and additional air or gas by said additional compressor to the combustion chamber.

The present invention has for its object, inter alia, further to increase the compression in the combustion chamber without the necessity of increasing the dimensions of the engine plant. With this object in view the invention consists substantially therein that the pistons of the additional compressor operate in cylinders which at their inner ends communicate with the crank case and at their outer ends with the valve controlled receiver, the compressor pistons being so coupled to the engine pistons that they contribute to the compression of the scavenging air in the crank case.

The invention has further for its object to outbalance the forces of inertia of the engine piston by so disposing the driving gear between the engine piston and the piston of the additional compressor that the latter counterbalances the engine piston. This will particularly be the case if the compressor cylinder and engine cylinder lie in the same plane on opposite sides of the crank shaft and the engine piston moves in a direction opposed to that of the compressor piston.

A further object of the invention is to simplify the driving gear between the engine piston and the compressor piston by using a common crank shaft as an integrating part of such gear.

In engines in which a common crank shaft cooperates with both the engine pistons and the compressor pistons the lubrication of the crank pins of the engine connecting-rods will be particularly difficult. This depends, inter alia, thereon that in engines supplied with scavenging air from the crank case so called spray lubrication cannot be used as the oil drops follow the scavenging air into the combustion chamber and there may cause dangerous explosions. For this reason all of the crank bearings must be directly lubricated. Such a direct lubrication offers, however, considerable difficulties in engines of the present type in which there are compressor crank pins adjacent to engine crank pins which makes the conventional lubrication systems useless.

The present invention has therefore for its further object to render possible such a direct lubrication and consists in the provision of a transport of lubrication oil from the compressor crank pins to the adjacent engine crank pins. Preferably the disposition is such that the engine crank pin according to the invention is supplied with lubrication oil from two directions, one oil source being the adjacent compressor crank pin and the other oil source being either a separate source or another adjacent compressor crank pin being on the opposite side of the engine crank pin.

The invention will now be further described with reference to the accompanying drawings on which Fig. 1 is a longitudinal vertical section through an engine having a single cylinder according to the invention, whereas Fig. 2 is a section perpendicular to that shown in Fig. 1 and on line 2—2 in the latter.

Fig. 5 is a modified embodiment of said portion.

Fig. 6 is a vertical cross section of a modified embodiment.

Figure 1:
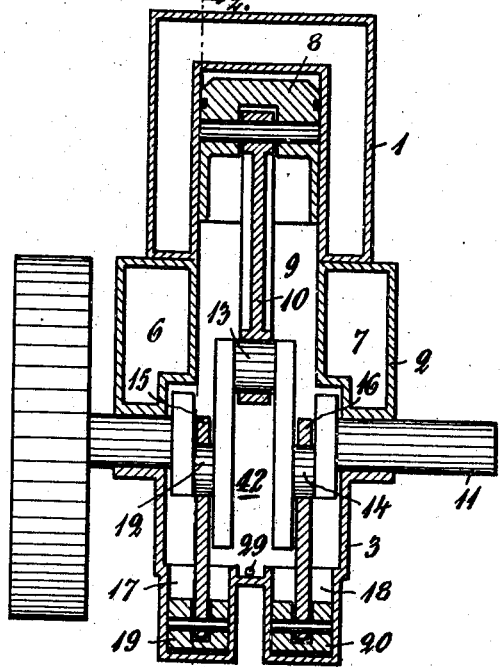
Figure 2:
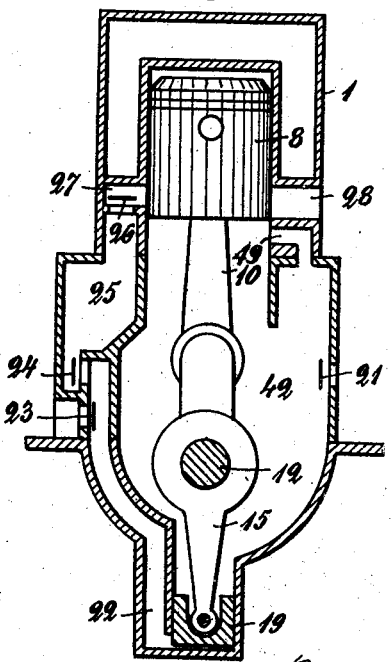

In the embodiment shown in Figs. 1 and 2 there is a single cylinder 1 and upper and lower crank case sections 2 and 3. The lower section 3 has two compressor cylinders 17 and 18 with appertaining pistons 19 and 20 as well as connecting-rods 15 and 16. The crank shaft 11 has compressor crank pins 12 and 14 and an engine crank pin 13 which are displaced about 180 degrees. To the engine cylinder 9 belongs a piston 8 and a connecting-rod 10. A duct 22 connects the underside of the compressor piston 19 with an air container or so called receiver 25. From this receiver air is conducted through the valve controlled duct 26 and the inlet 27 into the engine cylinder 9 when the piston 8 is in the neighbourhood of its lowermost position.

Of course, air may flow directly into the cylinder through the duct 26 and inlet 27 without using the valve disposed therein if the difference in level between the outlet 28 and the inlet 27 is adapted to suit the desired air and gas currents. Also the valve 23 may be left out if the pistons 19 and 20 respectively are provided with an inlet duct to the receiver 25 according to the so called two-port system.

The duct 49 connects the crank case 42 with the engine cylinder when the piston 8 takes up its lowermost position in which air previously sucked into the crank case through the valve 21 now flows into the engine cylinder.

The engine operates as follows. When the engine piston 8 is approaching its upper extreme position in the combustion chamber the compressor pistons 19 and 20 are approaching at the same time their diametrically opposite extreme positions, compare Figs. 1 and 2, so that air is sucked into the crank case 42 through the valve 21. Concurrently with this movement the air in the receiver 25 is compressed through air supply through the duct 22 and the valve 24. When now the pistons reverse their directions of movement and move towards the crank shaft the air sucked into the crank case 42 is compressed whereas the undersides of the pistons 19 and 20 suck air through the duct 22 and the valve 23. When the pistons are approaching the crank shaft the outlet 28 is uncovered by the piston 8 so that combustion gas flows out. When the pistons move towards the crank shaft, the pressure of the combustion gas falls until the duct 49 is uncovered. The pressure is then so low that the air compressed in the crank house flows above the piston into the engine cylinder. Nearly at the same moment as the duct 49 is uncovered the valve 26 is opened and air flows from the receiver 25 through the valve 26 and the inlet 27 into the engine cylinder.

Instead of two compressor pistons 19 and 20, a common compressor piston having two connecting-rods on both sides of the engine connecting-rod may be provided. If desired, only one compressor connecting-rod may be used in which case the balancing of the forces of inertia will, however, not be quite as good as in the case of two connecting-rods.

Figure 3:
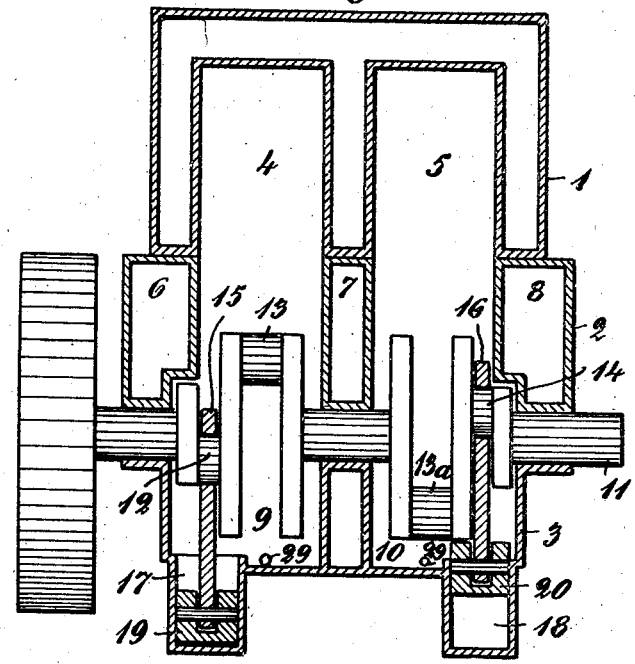
Fig. 3 is a longitudinal vertical section through a two-cylinder engine according to the invention.

Fig. 3 shows the construction of a two-cylinder engine, in which for each engine cylinder there is but one compressor cylinder. The displacement between each crank pin of the engine and that of the appertaining compressor is about 180 degrees. There is the same angular displacement between the two compressor crank pins. The operation is otherwise the same as that in the single cylinder engine.

In order to obtain an economical operation of the engine types above described, a perfect lubrication is of the greatest importance. In case each engine cylinder is associated with but one compressor and a corresponding compressor connecting-rod, a lubrication circuit according to Fig. 4 may be used. Similar lubrication conditions are applicable also when two compressor connecting-rods are provided, one being on each side of the engine connecting-rod.

Through the pipe 37 the lubrication oil enters an annular recess 41 and is fed therefrom through the channel 39 to the bearing surfaces between the compressor crank pin 12 and the corresponding connecting-rod 15 driving the compressor piston 19. The crank pin 12 is provided with a slot 32 and the connecting-rod 15 with a corresponding flange 33 whereby the oil is prevented from directly entering the crank case. The other side of the connecting-rod 15 is provided with an oil wiping-off flange 31, which throws out the oil on the inside of the annular shield 30. Through the channel 34 the oil then reaches the engine crank pin 13.

Figure 4:
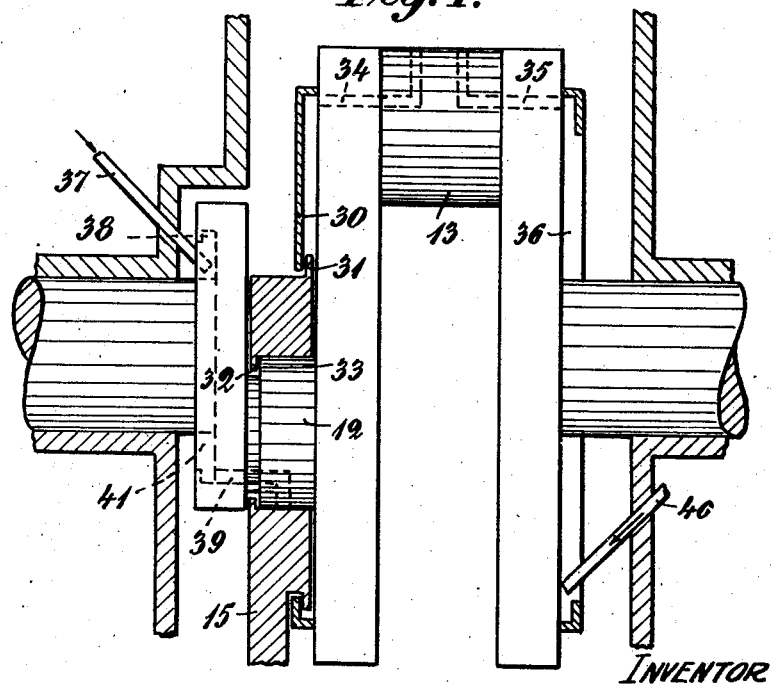
Fig. 4 shows a portion of the crank shaft on a greater scale.

When using only one compressor with one connecting-rod an additional lubrication can be provided through the other crank according to Fig. 4. Through the lubrication pipe 40 the lubrication oil enters the system on the inside of the annular flange 36 of the crank arm and flows therefrom through the channel 35 to the engine crank pin 13. In this way the engine crank pin receives double lubrication. When using two connecting-rods for each compressor cylinder, a disposition quite similar to that on the left hand side of the engine crank pin may be provided on the right hand side thereof, the lubrication being the same as that above described.

The device shown in Fig. 5 differs from that shown in Fig. 4 substantially therein that the compressor crank pin 12 is designed as an excentric disc with such large diameter that an annular recess 38 can be provided directly in said crank pin. The channel 39 extends therefrom radially. The annular flange 33 is in this case on the outside of the recess 38. This disposition is more compact, counted in the direction of the crank shaft, than the disposition according to Fig. 4.

Above it has been assumed that the scavenging air ducts in the engine cylinder enter on opposite sides thereof. In certain cases it might be preferable to arrange the scavenging ducts in the engine cylinder above one another and approximately on the same side of the engine cylinder. They may also be provided quite close to one another.

Also when the engine has more than two cylinders, it may be preferable, particularly from economical reasons, to provide more than one compressor for each engine.

As may be seen from Figs. 1 and 3 there are provided oil draining outlets 29 which are independent of the closed lubrication circuit passing through the crank pin bearing. Therefore the oil in said circuit cannot be mixed with impure waste oil from the engine cylinder or cylinders.

As indicated in Figs. 1 and 3 one or both end walls and/or longitudinal walls of the crank case and/or, in two or multi-cylinder engines, one or more of the partitions in the crank case between adjacent cranks may be formed entirely or partially as containers 6, 7, 8 preferably for lubricating oil. Such containers are preferably arranged in the upper section 2 of the crank case adjacent the engine cylinder or cylinders. Oil from the outlets 29 can be purified, if desired, and returned to the system.

In the arrangement shown in Figs. 4 and 5 the opening in the shield 30 may be considerably larger than the diameter of the ring 31. It is only necessary that the arrangement be such that the oil is thrown out on the inside of the shield 30 and is conducted therefrom to the crank pin 13.

Instead of the above described labyrinth packing 32, 33 of Fig. 4 there may be used an oil wiping-off device of a type known per se to prevent the oil from being thrown into the crank case.

Above it is assumed that the additional compressor 17, 18 pumps air into the motor. In gas engines the compressor may advantageously be used to pump gas instead of additional air into the engine.

In the embodiments shown on the drawings the compressor axis or axes is or are provided in the longitudinal central plane of the engine. It may, however, be found advantageous to dispose the compressor at an angle to this plane so that the axes of the engine cylinders form an angle to those of the compressor cylinders. Such an arrangement is shown in Fig. 6. This figure relates to a two-stroke engine of the crank case scavenging type and is particularly suitable when it is desired to modify an ordinary internal combustion engine so that it may be operated from a gas generator delivering for instance wood gas or coal gas. If so modified the engine will increase its output. The axis of the compressor cylinder 45 forms here an oblique angle of about 60 degrees to the axis of the engine cylinder 1. The connecting-rod 15' of the compressor piston is pivotally connected with the connecting-rod 10 of the engine piston 8. The interconnection is made at a point 46 on the latter connecting-rod between the appertaining crank pin and piston pin.

When the crank shaft rotates in the direction of the arrow the engine piston 8 moves upwards and the compressor piston 19 is pushed inwards in its cylinder 45. This movement of the piston 19 continues also after the piston 8 has passed its highest position and until a moment when the pivot point 46 has reached its extreme left hand position, whereupon the piston 19 is urged to move in a reverse direction. Air or gas respectively is hereby sucked-in through the valve 23 and then forced through the valve 24 into the receiver 25'. From the receiver the air or gas is let into the combustion chamber of the cylinder 1 in suitable moments defined by a valve 44 which is positively governed. In a manner known per se scavenging air from the crank case 42 is let-in directly through the inlet 49 in the lowermost position of the piston 8.

What is claimed is:

1. An internal combustion engine comprising in combination at least one combustion chamber, an engine piston reciprocable therein, a crank case, a crank shaft mounted in said crank case, a scavenging air inlet disposed in the wall of said combustion chamber and communicating directly with said crank case, a valve controlled receiver for gaseous fluid communicating with said combustion chamber, a compressor cylinder communicating at its inner end with said crank case and at its outer end with said receiver but being otherwise separated from said combustion chamber and crank case, a compressor piston reciprocable in said compressor cylinder, and a driving connection including said crank shaft adapted to transmit power from said engine piston to said compressor piston to reciprocate the latter and urge it to compress said gaseous fluid in said receiver and simultaneously to aid said engine piston to compress air in said crank case.

2. An engine as claimed in claim 1, in which there are more than one compressor cylinders and corresponding compressor pistons which cooperate with each engine cylinder and the corresponding engine piston.

3. An engine as claimed in claim 1, in which the driving connection for each compressor piston comprises an engine connecting-rod swingably interconnecting the engine piston with the crank shaft and a compressor connecting-rod swingably interconnecting the compressor piston with a point on the engine connecting-rod.

4. An internal combustion engine comprising in combination at least one engine cylinder forming a combustion chamber, an engine piston reciprocable therein, a crank case, communicating with the inner end of said engine cylinder, a crank shaft mounted in said crank case, an air compressor cylinder communicating at its inner end with said crank case, a compressor piston reciprocable in said compressor cylinder and adapted to compress scavenging air for said engine, adjacent crank pins forming part of said crank shaft, connecting rods journaled on said crank pins and serving to operatively connect said engine piston and said compressor piston with said crank shaft, means for feeding oil to the compressor crank pin attached to said compressor piston and means for feeding oil from the last mentioned crank pin to the adjacent engine crank pin attached to said engine piston.

5. An engine as claimed in claim 4 wherein only one compressor crank pin is provided for each engine crank pin and in which the engine crank pin is fed with lubrication oil from another source in addition to the compressor crank pin.

6. An engine as claimed in claim 4 wherein two compressor cylinders are arranged symmetrically in regard to and both belonging to one engine cylinder and in which both compressor crank pins are provided with means for feeding lubrication oil to the engine crank pin.

7. An engine as claimed in claim 4 wherein a compressor crank pin is immediately associated with the engine crank pin and in which the bearing of the compressor crank pin is provided on its outside with an oil stopping device adapted to prevent lubrication oil from being thrown into the crank case.

8. An engine as claimed in claim 4, in which the bearing of the compressor crank pin is provided with oil-stopping devices at its end facing the bearing of the engine crank pin which stopping devices are adapted to safeguard the feeding of lubrication oil to the bearing of the engine crank pin.

9. An engine as claimed in claim 4 in which oil-stopping or oil-catching device is provided at the bearing of the engine crank pin, said oil stopping device being constituted by a shield which is tightened against the bearing of the compressor crank pin by a labyrinth packing.

10. An engine as claimed in claim 4, in which an oil wiping-off ring is provided in the bearing of the compressor crank and adapted to throw lubrication oil from said bearing into an oil catching device provided at the bearing of the engine crank pin.

11. An engine as claimed in claim 1 including an engine connecting-rod and compressor connecting-rod coupled side by side to the same crank shaft and a compressor cylinder disposed outside the path of rotation described by the engine crank pin and provided with a baffle plate to stop flow of oil from the oil drainage space of the crank case.

12. An engine as claimed in claim 4 including a draining device, independent of the system of lubrication of the bearings of the crank shaft and adapted to drain off from the crank case such waste oil which originates from the engine cylinder.

13. An engine as claimed in claim 4 including a separate oil lubrication circuit adapted to lubricate in order of sequence the bearing of the compressor crank pin and the bearing of the engine crank pin.

14. An internal combustion engine comprising in combination at least one combustion chamber, an engine piston reciprocable therein, a crank case, a crank shaft mounted in said crank case and driven by said engine piston, a scavenging air inlet disposed in the wall of said combustion chamber and communicating directly with said crank case, a valve controlled scavenging air receiver communicating with said combustion chamber, a compressor cylinder mounted in the same plane but on the opposite side of said crank shaft from said combustion chamber, said compressor cylinder communicating at its inner end with said crank case and at its outer end with said receiver, a compressor piston reciprocable in said compressor cylinder, air admission means connecting with said compressor cylinder, means for driving said compressor piston from said crank shaft to compress air admitted therein and to deliver said compressed air to said receiver, said driving means being so connected to said crank shaft that said engine piston and said compressor piston reciprocate in opposite directions, thereby simultaneously compressing air in said crank case and means for admitting said compressed air for scavenging purposes into said combustion chamber.

BROR ALGOR DE WAERN.